United States Patent [19]

Styba et al.

[11] Patent Number: 5,775,044
[45] Date of Patent: Jul. 7, 1998

[54] LOADING DOCK HAVING A SPLIT DOCK SEAL

[76] Inventors: Loren K. Styba, 3368 W. Southwood Dr., Franklin, Wis. 53132; Joseph J. Tramonte, Jr., 2628 N. 93rd, Wauwatosa, Wis. 53226

[21] Appl. No.: 646,088

[22] Filed: May 7, 1996

[51] Int. Cl.⁶ .............................. E04H 9/14; E04H 14/00
[52] U.S. Cl. ............................... 52/173.2; 160/40
[58] Field of Search ..................... 52/173.2; 160/40

[56] References Cited

U.S. PATENT DOCUMENTS

| | | | |
|---|---|---|---|
| 3,181,205 | 5/1965 | Frommelt et al. | 52/173.2 |
| 4,213,279 | 7/1980 | Layne | 52/173.2 |
| 4,574,542 | 3/1986 | Kleynjans | 52/173.2 |
| 5,125,196 | 6/1992 | Moody . | |
| 5,473,846 | 12/1995 | Giuliani et al. . | |

Primary Examiner—Carl D. Friedman
Assistant Examiner—Timothy Kang

[57] ABSTRACT

A loading dock including a dock wall having a dock opening, and an engaging member (e.g., a resilient head pad) positioned adjacent to the dock opening. The engaging member is mounted for vertical movement relative to the dock wall, and the engaging member includes a front face adapted to engage a back of a vehicle to accommodate relative vertical movement between the back of the vehicle and the dock wall. A base member is secured to the loading dock, and the engaging member is vertically movably mounted to the base member. A urethane coating between the engaging member and base member provides a low friction interface therebetween. The engaging member is interconnected with the base member via a tether member that is formed from an extension of a cover on the engaging member.

5 Claims, 3 Drawing Sheets

LOADING DOCK HAVING A SPLIT DOCK SEAL

FIELD OF THE INVENTION

The present invention generally relates to the field of loading docks, and more specifically to dock seals that are positioned around a loading dock opening to provide a seal between the loading dock and the open end of a truck or trailer.

BACKGROUND OF THE INVENTION

Most warehouses, manufacturing facilities and large retail stores include loading docks that provide a location for loading and unloading trucks and trailers. Loading docks typically include a raised platform and a dock opening positioned above the raised platform. The dock opening is formed by a dock wall having two vertical side portions extending upwardly from the platform, and a horizontal upper portion connecting the top of the side portions. Trucks and trailers can back toward the dock opening until the back of the truck or trailer is abutting the platform. The platform sometimes includes a dockleveler that provides a ramp between the platform and the bed of the truck or trailer to facilitate loading and unloading thereof (e.g., by a fork-lift).

Many loading docks include dock seals that provide a seal between the dock wall and the back of the truck or trailer. For example, such dock seals can include side pads and a head pad positioned along the side portions and upper portion, respectively. The pads are commonly made from a wear resistant fabric (e.g., urethane-coated fabric) surrounding a resilient material (e.g., foam) that is compressed when the back of the truck or trailer is positioned against the loading dock. The compressed pads provide a barrier against the elements (e.g., wind, rain and snow), thereby providing a comfortable working environment for the personnel working near the loading dock, and further provide a barrier against the loss of heat or cooling from inside the building.

The above described dock seals provide good protection against the elements. However, as with most loading dock equipment, it must withstand repeated uses under a variety of weather and loading conditions. Any increase in longevity of the dock seals would therefore be an improvement.

SUMMARY OF THE INVENTION

It has been recognized that the fabric forming the dock seal pads can wear out after repeated uses. Further, the pads can become dislodged from the side and upper portions that form the opening. The present invention includes the recognition that these two problems are caused in part by the fact that the back end of the trucks and trailers may move vertically several inches when they are being loaded and unloaded. Further, when a trailer is being positioned at a loading dock by a trailer jockey, the back end of the trailer can move vertically by as much as several inches or more as the trailer jockey lowers the front of the trailer to the ground. This vertical movement of the rear of the trailer occurs after the upper horizontal edge of the back of the trailer has compressed and dug into the head pad. The subsequent vertical movement can therefore cause significant shearing forces on the head pad, sometimes resulting in tearing of the fabric or pulling the head pad from the dock wall.

To alleviate this problem the present invention provides a loading dock that accommodates relative movement between the engaging member and the loading dock. In one aspect, the loading dock includes a dock wall including a dock opening formed by a generally horizontal upper portion, and a resilient head pad interconnected with the upper portion. The head pad is mounted for vertical movement relative to the dock wall, and includes a front face adapted to resiliently engage and move with a back of a vehicle to accommodate relative vertical movement between the back of the vehicle and the dock wall. Preferably, the dock opening is also formed by two generally vertical side portions, and the loading dock further includes a resilient side pad positioned on each of the side portions. The head pad can be made of a back pad connected to the dock wall and having a front surface generally facing a vehicle backing against the head pad, and a front pad positioned adjacent the front surface, the front pad being vertically movably mounted relative to the dock wall.

In another aspect, the loading dock includes a dock wall having a dock opening, and an engaging member (e.g., a resilient pad) positioned adjacent to the dock opening. The engaging member is mounted for vertical movement relative to the dock wall, wherein the engaging member includes a front face adapted to engage a back of a vehicle to accommodate relative vertical movement between the back of the vehicle and the dock wall.

In one embodiment, the loading dock further includes a base member secured to the loading dock, wherein the engaging member is vertically movably mounted to the base member. For example, the base member can include a resilient material, such as foam, covered with a wear-resistant material, such as urethane-coated fabric. Preferably, the base member includes a front surface facing the engaging member, and the engaging member includes a rear surface facing the front surface, and the loading dock further includes low friction means (e.g., urethane coating) for providing a low friction interface between the front and rear surfaces. The engaging member can be interconnected with the loading dock via a tether member that is formed from an extension of a cover on the engaging member.

In yet another aspect, the present invention provides a method of providing a seal between a loading dock and a back of a vehicle. The method includes the steps of backing the vehicle toward the loading dock, engaging the back of the vehicle with an engaging member that is vertically movably mounted relative to the loading dock, vertically moving the back of the vehicle while the vehicle is in engagement with the engaging member, and vertically moving the engaging member in response to the vertical movement of the back of the vehicle.

DETAILED DESCRIPTION

Figure 1:
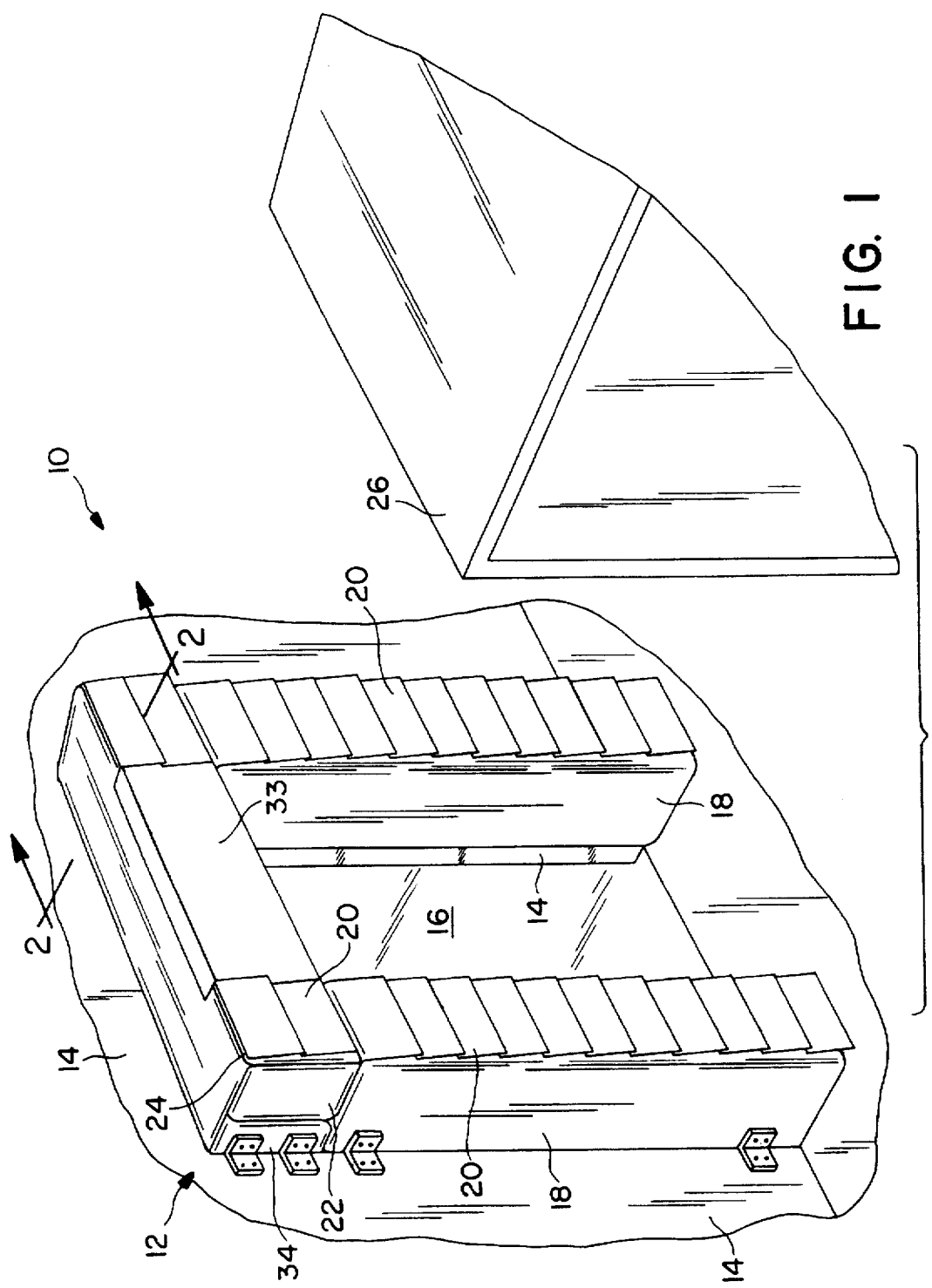
FIG. 1 is a perspective view of a dock seal embodying the present invention.
Figure 2:
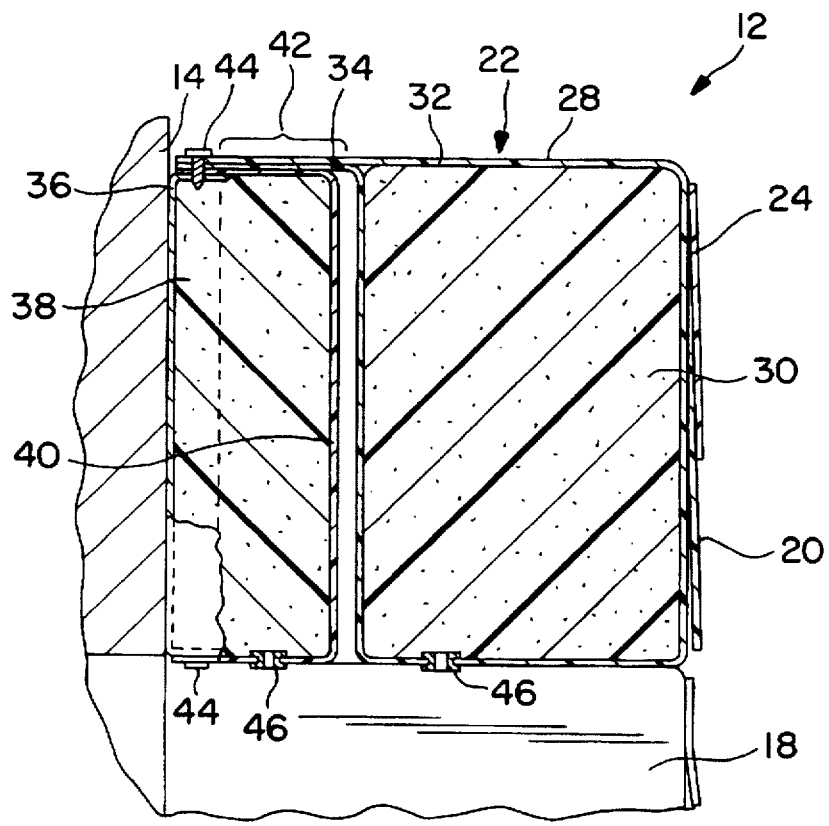
FIG. 2 is a partial section of the dock seal taken through a vertical plane along line 2—2 in FIG. 1.

FIGS. 1 and 2 illustrate a dock seal 10 embodying the present invention. In the illustrated embodiment, the dock seal 10 includes a head pad assembly 12 that is mounted to a dock wall 14 above the opening 16 of a loading dock. The illustrated head pad assembly 12 is used in conjunction with two side pads 18 that are mounted to the dock wall 14 along the sides of the opening 16. Both the side pads 18 and the head pad assembly 12 include a purality of wear pleats 20 that are designed to improve he wear resistance of the pads. It should be noted that the wear pleats are not needed for practice of the present invention.

In accordance with the present invention, the head pad assembly 12 includes an engaging member 22 mounted for vertical movement relative to the dock wall 14 such that a front face 24 of the engaging member 22 is adapted to engage a back of a vehicle 26 to accommodate relative vertical movement between the back of the vehicle 26 and the dock wall 14. In the illustrated embodiment, the engaging member 22 comprises a front pad 28 having a foam core 30 encased within an )outer fabric 32. The foam core 30 comprises a resilient foam material, such as a 3400 grade, 1.2 density foam available from General Foam of Bridgeview, Ill. The outer fabric 32 comprises a urethane-coated fabric, such as a 22 oz. vinyl base fabric with a 3 oz. urethane coating, manufactured by Globe International of Buffalo, N.Y. Referring to FIG. 1, the front pad 28 includes a wear face fabric 33 wrapped around the top and bottom of the front pad 28 and extending between the wear pleats 20. The wear face fabric 33 is secured (e.g., sewn) to the top and bottom of the front pad 28. The wear pleats 20 and wear face fabric 33 are made from a TS-55 wear face fabric manufactured by Cooley, Inc. of Thornton, Ill.

The illustrated head pad assembly 12 further includes a back pad 34 secured to the dock wall 14. The back pad 34 includes a metal pan 36 secured to the dock wall 14, a foam core 38 positioned within the metal pan 36, and an outer fabric 40 surrounding the foam core 38 and secured to the metal pan 36. As with the front pad 28, the foam core 38 of the back pad 34 comprises resilient foam material, and the outer fabric 40 of the back pad 34 comprises a urethane-coated fabric. To facilitate a low friction, sliding interface between the back pad 34 and the front pad 28, the outer fabrics of both the front pad 28 and the back pad 34 are oriented with the urethane surface (i.e., the smoother, more glossy side) of the outer fabric facing outward. Alternative means for providing low friction could also be used, such as using a teflon material or a rolling interface.

As best shown in FIG. 2, the outer fabric 32 of the front pad 28 forms a tether member 42 that extends rearwardly from an upper surface of the front pad 28 to an upper surface of the metal pan 36. The tether member 42 is slightly longer than necessary (i.e., the tether member 42 extends forwardly slightly beyond the front face of the back pad 34) to thereby facilitate upward movement of the front pad 28 relative to the back pad 34. The outer fabrics 32,40 of both the front pad 28 and the back pad 34 are secured to the metal pan 36 via self tapping screws 44 that extend through reinforcing grommets (not illustrated) in each layer of fabric. Air relief grommets 46 are positioned in a lower surface of both the front pad 28 and the back pad 34.

Figure 3:
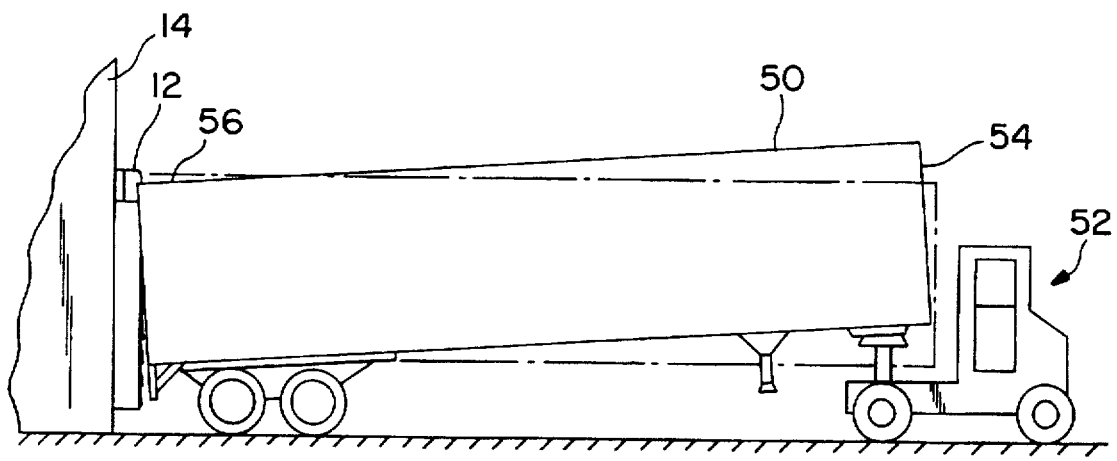
FIG. 3 is a side view of a trailer being backed into the dock seal illustrated in FIG. 1.

FIG. 3 illustrates a trailer 50 being positioned at a loading dock by a trailer jockey 52. As illustrated, the trailer jockey 52 raises the front 54 of the trailer 50 so that the back 56 of the trailer 50 can be positioned at the dock opening 16. With the front 54 of the trailer 50 raised, the back 56 of the trailer 50 is in a lowered position relative to the dock wall 14. Once the back 56 of the trailer 50 is properly positioned in engagement with the head pad assembly 12, the trailer jockey 52 lowers the front 54 of the trailer 50, resulting in the back 56 of the trailer 50 moving to a raised position, illustrated in phantom in FIG. 3.

Figure 4:
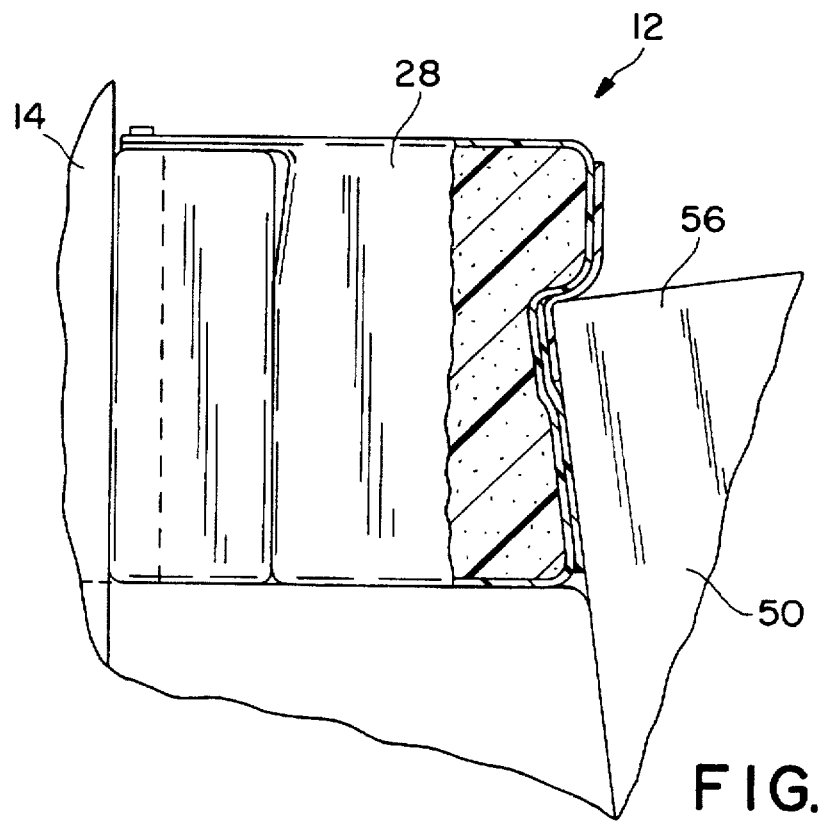
FIG. 4 is the partial section of FIG. 2 showing a back of a trailer engaging the dock seal with the back of the trailer in a lowered position.
Figure 5:
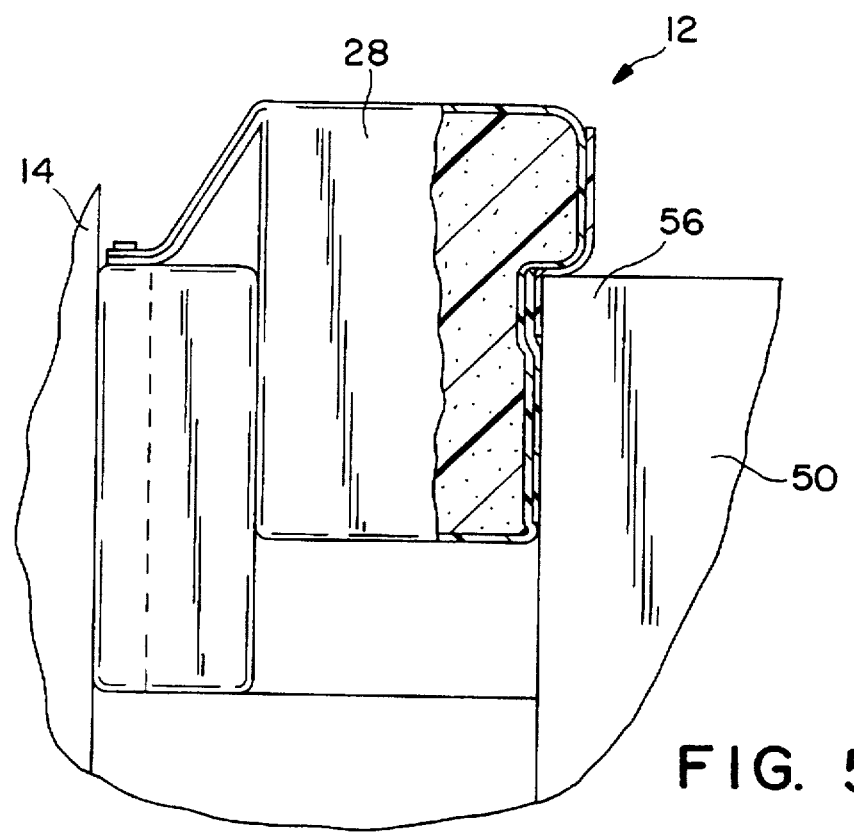
FIG. 5 is the partial side section of FIG. 4 with the back of the trailer in a raised position.

FIGS. 4 and 5 illustrate how the head pad assembly 12 responds to this vertical movement of the back 56 of the trailer 50. FIG. 4 illustrates the back 56 of the trailer 50 in a lowered position and engaged with the front pad 28. Due to its resilient nature, the front pad 28 will compress to accommodate the back 56 of the trailer 50. When the front 54 of the trailer 50 is lowered by the trailer jockey 52, the back 56 of the trailer 50 moves to a raised position, as illustrated in FIG. 5. By virtue of the present invention, the front pad 28 will move vertically upwardly along with the back 56 of the trailer 50. Such upward movement of the front pad 28 relative to the dock wall 14 reduces the shear stresses placed on the head pad assembly 12, thereby reducing the likelihood that the head pad assembly 12 will tear or become dislodged from the dock wall 14.

The foregoing description of the present invention has been presented for purposes of illustration and description. Furthermore, the description is not intended to limit the invention to the form disclosed herein. Consequently, variations and modifications commensurate with the above teachings, and the skill or knowledge of the relevant art, are within the scope of the present invention. The embodiments described herein are further intended to explain best modes known for practicing the invention and to enable others skilled in the art to utilize the invention in such, or other, embodiments and with various modifications required by the particular applications or uses of the present invention. It is intended that the appended claims be construed to include alternative embodiments to the extent permitted by the prior art.

What is claimed is:

1. A method of providing a seal between a loading dock and a back of a vehicle, said method comprising the steps of:
   backing the vehicle toward the loading dock;
   engaging the back of the vehicle with an engaging member that is vertically movably mounted relative to the loading dock;
   vertically moving the back of the vehicle while the vehicle is in engagement with the engaging member; and
   vertically moving the engaging member in response to said vertical movement of the back of the vehicle.

2. A method as claimed in claim 1, wherein said engaging member is compressible, and wherein said engaging step comprises the step of compressing the engaging member.

3. A method as claimed in claim 2, wherein said engaging member comprises a resilient foam material, and wherein said compressing step comprises the step of compressing the foam material.

4. A method as claimed in claim 1, further comprising the step of securing a back pad to the loading dock, wherein the engaging member is positioned above said opening, and wherein said engaging step comprises engaging the back of the vehicle with the engaging member above the opening.

5. A method as claimed in claim 1, further comprising the step of securing a back pad to the loading dock, wherein the engaging member comprises a front pad positioned in front of the back pad, and wherein said step of vertically moving the engaging member comprises moving the front pad relative to the back pad.

* * * * *